(12) United States Patent
Ridley et al.

(10) Patent No.: US 8,411,930 B2
(45) Date of Patent: Apr. 2, 2013

(54) SYSTEM AND A METHOD FOR DETECTING A DAMAGED OR MISSING MACHINE PART

(75) Inventors: Rodney K. Ridley, Edmonton (CA); Tadeusz Kazmierczak, Edmonton (CA); Linsong Cai, Edmonton (CA); Paul Charles Johnston, Edmonton (CA); Helen Pinto, Calgary (CA); Jun Sun, Calgary (CA); Marc Provencher, Calgary (CA); John Harry Woolley, Edmonton (CA); Garry Cardinal, Edmonton (CA)

(73) Assignee: Alberta Research Council Inc., Edmonton, CA (US)

( * ) Notice: Subject to any disclaimer, the term of this patent is extended or adjusted under 35 U.S.C. 154(b) by 651 days.

(21) Appl. No.: 12/300,257

(22) PCT Filed: May 4, 2007

(86) PCT No.: PCT/CA2007/000776
§ 371 (c)(1),
(2), (4) Date: Nov. 10, 2008

(87) PCT Pub. No.: WO2007/131326
PCT Pub. Date: Nov. 22, 2007

(65) Prior Publication Data
US 2010/0142759 A1     Jun. 10, 2010

(30) Foreign Application Priority Data

May 12, 2006  (CA) .................................. 2546758

(51) Int. Cl.
*G06K 9/00* (2006.01)
(52) U.S. Cl. ...................................................... 382/152
(58) Field of Classification Search .................. 382/209, 382/217, 218, 141, 152
See application file for complete search history.

(56) References Cited

U.S. PATENT DOCUMENTS 4,399,554 A    8/1983   Perkins, III et al.
(Continued)

FOREIGN PATENT DOCUMENTS

JP          09101374 A2    4/1997

OTHER PUBLICATIONS

Sun, Changming, "Rectangular Subregioning and 3-D Maximum-Surface Techniques for Fast Stereo Matching," IEEE Workshop on Stereo and Multi-Baseline Vision in conjunction with IEEE CVPR-2001, pp. 44-53, Kauai, Hawaii, Dec. 9-10, 2001.

(Continued)

*Primary Examiner* — Tarifur Chowdhury
*Assistant Examiner* — Jonathan Hansen
(74) *Attorney, Agent, or Firm* — Rodman & Rodman; Terrence N. Kuharchuk (57) ABSTRACT

A system and a method for detecting a damaged or missing machine part. The system includes an image capturing device for capturing images of the machine and a processor for processing the captured images. The system may further include a sensible output for providing an indication of a damaged or missing machine part. The method includes capturing images of the machine against a background which moves relative to the machine over time, selecting a pair of time-separated images from the captured images, generating a displacement image from the pair of images, comparing the machine from the displacement image with a machine model, and identifying a damaged or missing machine part from the comparison of the displacement image with the machine model. The method may further include providing a sensible output which indicates a damaged or missing machine part.

23 Claims, 6 Drawing Sheets

U.S. PATENT DOCUMENTS

| | | | |
|---|---|---|---|
| 5,333,208 A * | 7/1994 | Massen | 382/111 |
| 5,743,031 A | 4/1998 | Launder et al. | |
| 6,175,107 B1 * | 1/2001 | Juvinall | 250/223 B |
| 6,796,709 B2 | 9/2004 | Choi | |
| 6,870,485 B2 | 3/2005 | Lujan et al. | |
| 6,911,653 B2 * | 6/2005 | Yagita | 250/341.1 |
| 6,934,357 B2 * | 8/2005 | Boyd et al. | 378/62 |
| 7,342,655 B2 * | 3/2008 | Yagita | 356/239.5 |
| 7,474,392 B2 * | 1/2009 | Van Soest | 356/52 |
| 7,636,449 B2 * | 12/2009 | Mirtich et al. | 382/100 |
| 2005/0081410 A1 | 4/2005 | Furem et al. | |
| 2005/0226489 A1 * | 10/2005 | Beach et al. | 382/141 |
| 2006/0208172 A1 * | 9/2006 | Akkerman et al. | 250/223 B |
| 2008/0291438 A1 * | 11/2008 | Akkerman et al. | 356/240.1 |
| 2008/0310701 A1 * | 12/2008 | Caroli et al. | 382/141 |
| 2009/0046923 A1 * | 2/2009 | Chang et al. | 382/152 |
| 2010/0246930 A1 * | 9/2010 | Dekker et al. | 382/141 |
| 2010/0290694 A1 * | 11/2010 | Dubois et al. | 382/141 |

OTHER PUBLICATIONS

Sun, Changming, "Fast Optical Flow Using 3D Shortest Path Techniques," Image and Vision Computing, vol. 20, No. 13/14, Dec. 2002, pp. 981-991.

Sun, Changming, "Multi-Resolution Rectangular Subregioning Stereo Matching Using Fast Correlation and Dynamic Programming Techniques," CMIS Report No. 98/246, Dec. 1998, 25 pp.

Scharstein, Daniel and Szeliski, Richard, "A Taxonomy and Evaluation of Dense Two-Frame Stereo Correspondence Algorithms," International Journal of Computer Vision, 2002, vol. 47, pp. 7-42.

Sun, Changming, "A Fast Stereo Matching Method," Digital Image Computing: Techniques and Applications, Massey University, Auckland, New Zealand, Dec. 10-12, 1997, pp. 95-100.

Sun, Changming, "Multi-Resolution Stereo Matching Using Maximum-Surface Techniques," Digital Image Computing: Techniques and Applications, Perth, Australia, Dec. 7-8, 1999, pp. 195-200.

Di Stefano, L. et. al., "A Fast Area-Based Stereo Matching Algorithm," Image and Vision Computing, 2004, vol. 22, 8 pp.

Xiujuan Lua, University of Alberta research project, "Missing Tooth Detection," 2002, 2 pp.

Poitras, B., "Missing teeth on mining shovel nothing to smile about," Journal: R and D at the Alberta Research Council, Sep. 30, 2004, Canada.

"Coal-winning equipment," Colliery Guardian, vol. 238, No. 9, Sep. 1990, United Kingdom, pp. 245-246, 248-249.

"No more toothaches for mining shovels," Coal Age, vol. 110, No. 8, Aug. 2005, pp. 33-34.

Johnson, Guy A., "Productivity losses from lost shovel teeth," Annual Meeting—Minnesota Section, AIME 54th, 1981, 24 pp.

Xiujuan Luo et. al., "Missing tooth detection with laser range sensing," Fifth World Congress on Intelligent Control and Automation, IEEE Cat. No. 04EX788, vol. 4, 2004, pp. 3607-3610.

Chapters 11 and 12, Matrox Software Operator's Manual No. 10513-301-0610, Version 6.1, Matrox Electronic Systems Ltd., Matrox Imaging Library, Canada, 2000, 38 pp.

A. Murat Tekalp, Digital Video Processing, Chapter 6.3: "Block-Matching Method," New Jersey, Prentice Hall PTR, 1995, 4 pp.

* cited by examiner

SYSTEM AND A METHOD FOR DETECTING A DAMAGED OR MISSING MACHINE PART

TECHNICAL FIELD

A system and a method for detecting a damaged or missing machine part using image analysis and computer vision techniques.

BACKGROUND OF THE INVENTION

Various technologies have been proposed for inspecting machines and/or detecting and reporting incidences of damage to machine parts.

Japan Patent Application No. 07257561 (Fumiaki et al) describes a method for detecting a wrong or missing engine part which involves capturing images using a CCD camera and comparing detection data with reference data based upon the brightness distribution within regions of the captured images.

U.S. Pat. No. 4,399,554 (Perkins, III et al) describes a system for inspecting engine head valve spring assemblies for missing retainer keys which comprises a solid state camera for taking pictures of a valve spring assembly and providing picture data, a position encoder which relates the position of the engine head to the camera, and a computer which analyzes the picture data to determine the center of a digitized image of a valve spring assembly and an intensity profile of the expected location of the retainer keys relative to the center of the valve spring assembly, which intensity profile is used to determine whether a retainer key is missing.

U.S. Pat. No. 5,743,031 (Launder et al) describes an apparatus for providing a signal indicative of loss or imminent loss of digging hardware. The apparatus includes an actuatable indicator and an actuator. In the preferred embodiments the actuator is comprised of a lanyard which is secured between an adaptor and a digging tooth. If the digging tooth breaks off or becomes dislodged from the adaptor, the lanyard senses the change in predetermined relationship between the adaptor and the digging tooth and actuates the actuatable indicator. In the preferred embodiments the actuatable indicator is comprised of a smoke canister.

U.S. Pat. No. 6,796,709 (Choi) describes a method and system for estimating turbine bucket oxidation condition. The method includes measuring with an infrared camera a temperature distribution on a surface of a rotating turbine bucket, determining a condition index based upon the temperature distribution, and estimating the turbine bucket oxidation condition based on the condition index. The system includes the infrared camera, a triggering mechanism coupled with the infrared camera for triggering the camera at predetermined intervals based upon the rotating speed of the turbine, and a processor for receiving the output from the infrared camera and for determining the condition index.

U.S. Pat. No. 6,870,485 (Lujan et al) describes a method and apparatus for detecting and reporting dislocation of heavy metal parts on mining equipment. The apparatus includes a spring loaded switch sandwiched between heavy metal parts, which upon partial separation of the parts expands and turns on an electrical switch to activate a radio transmitter, sending an alarm signal to a receiver at a remote location.

United States Patent Application Publication No. US 2005/0081410 A1 (Furem et al) describes a system and method for distributed reporting of machine performance. The system is comprised of a machine data management system which permits information relating to a machine to be gathered and analyzed while the machine is operating.

Another technology proposed by the University of Alberta (Xiujuan Luo) uses laser range data for detecting missing shovel teeth. The technology involves creating a CAD model of an intact tooth, using a laser range finder to scan the tooth line of a shovel, and comparing the laser scan with the CAD model to detect missing teeth.

Finally, Motion Metrics International Corp. of Vancouver, British Columbia offers a broken tooth detection system for mining shovels and loaders under the trade-mark ToothMetrics™.

SUMMARY OF THE INVENTION

The present invention is a system and a method for detecting a damaged or missing machine part. The invention may also be comprised of a computer which is programmed to perform aspects of the method. The invention may also be comprised of a computer readable medium which contains computer readable instructions for performing aspects of the method. The invention may also be comprised of a signal which is operable to cause a processor to perform aspects of the method.

The machine may be any type of machine and the machine part may be comprised of any type of part associated with the machine.

In a first broad system aspect, the invention is comprised of:
 (a) an image capturing device such as a camera, for capturing images of a machine against a background which moves relative to the machine over time; and
 (b) a processor for processing the captured images to determine whether one or more machine parts is damaged or missing.

In preferred embodiments of the invention, the machine is a mining shovel and the machine part is a tooth on the bucket of the shovel.

In a second system aspect, the invention is comprised of:
 (a) an image capturing device such as a camera, for capturing images of a bucket tooth line against a background which moves relative to the bucket over time; and
 (b) a processor for processing the captured images to determine whether one or more teeth on the bucket is damaged or missing.

The processor is preferably programmed to perform aspects of the method of the invention.

The system of the invention may also be comprised of a sensible output for providing an indication of a damaged or missing tooth. The sensible output may be comprised of a visual display, an audible alarm, or any other type of output which may be sensed by a person or apparatus. For example, the sensible output may be comprised of a signal which causes the mining shovel to stop operating when a damaged or missing tooth is detected.

The image capturing device is preferably mounted on the mining shovel so that a clear image of the bucket tooth line may be obtained at some point during the operation of the mining shovel as a load is taken up by the mining shovel, moved to an unloading position and then dumped at the unloading position. Preferably the image capturing device is mounted on the mining shovel so that a clear image of the bucket tooth line may be obtained immediately after the load is dumped at the unloading position.

The processor may be located at any suitable position on or within the mining shovel. The processor may alternatively be located remotely of the mining shovel. A communication link is provided between the image capturing device and the processor so that the captured images may be provided to the processor for processing. The communication link may be comprised of any suitable type of link, including wired communication links and wireless communication links.

In a first broad method aspect, the invention is comprised of:
(a) capturing images of a machine against a background which moves relative to the machine over time;
(b) selecting two time-separated images which reflect movement of the background relative to the machine;
(c) generating a displacement image from the two time-separated images, wherein the displacement image provides an indication of movement of each pixel represented in the displacement image between the two time-separated images;
(d) comparing the machine from the displacement image with a model machine; and
(e) identifying a damaged or missing machine part from the comparison of the machine from the displacement image and the model machine.

The second method aspect may be further comprised of providing a sensible output which indicates a damaged or missing machine part.

In preferred embodiments the method of the invention involves the capturing of at least two images of a mining shovel bucket with an image capturing device such as a camera, while the mining shovel is operating. For example, if two images are captured at different times while the mining shovel is operating, the apparent movement of pixels representing the bucket and the apparent movement of pixels representing the background of the image will be different, as long as the bucket moves relative to the background during the time between the capturing of the two images. The difference in movement can be used to determine which pixels in the images represent the bucket and which pixels in the image represent the background. More particularly, a displacement image may be generated from the two images, which displacement image will provide an indication of which pixels have "moved" between the two images and which images have not moved between the two images.

In a second method aspect, the invention is comprised of:
(a) capturing images of the bucket tooth line against a background which moves relative to the bucket over time;
(b) selecting two time-separated images which reflect movement of the background relative to the bucket;
(c) generating a displacement image from the two time-separated images, wherein the displacement image provides an indication of movement of each pixel represented in the displacement image between the two time-separated images;
(d) comparing the bucket tooth line from the displacement image with a model bucket tooth line; and
(e) identifying a damaged or missing tooth from the comparison of the bucket tooth line from the displacement image and the model bucket tooth line.

The second method aspect may be further comprised of providing a sensible output which indicates a damaged or missing tooth.

In a third method aspect, the invention is comprised of:
(a) capturing a number of time-separated images of a bucket tooth line against a background which moves relative to the bucket over time;
(b) initial processing one or more pairs of the captured images to select a suitable pair of images from the gathered images, having regard to one or more of the following:
 (i) whether the bucket tooth line can be adequately identified in the pair of images (the bucket is not completely fixed relative to the image capturing device, but may raise and lower relative to the image capturing device and may move toward or away from the image capturing device. As a result, the bucket tooth line is adequately identified in the pair of images when it is within a defined position zone of the image and has a size in the image which is within a defined size range);
 (ii) whether the background is moving relative to the image capturing device and the bucket tooth line (since the method of the invention requires the generation of displacement images, the method will not work if there is no movement of the background relative to the image capturing device and the bucket tooth line); and
 (iii) whether the magnitude of the relative movement of the background between two images in a pair of images is within a desired range (too little movement reduces the resolution of the method and too much movement taxes the processing capabilities of the system by requiring a larger area of the images to be processed);
(c) final processing the suitable pair of images to generate a displacement image from the suitable pair of images, wherein the displacement image provides an indication of movement of each pixel represented in the displacement image between the two images in the suitable pair of images;
(d) comparing the bucket tooth line from the displacement image with a model bucket tooth line; and
(e) identifying a damaged or missing tooth from the comparison of the bucket tooth line from the displacement image and the model bucket tooth line.

The third method aspect may be further comprised of providing a sensible output which indicates a damaged or missing tooth.

In a fourth method aspect, the invention is comprised of:
(a) capturing a sequence of images using an image capturing device such as a video camera;
(b) initial processing one or more pairs of the captured images to select a suitable pair of images from the gathered images;
(c) generating a displacement image from the suitable pair of images, wherein the displacement image provides an indication of movement of each pixel represented in the displacement image between the two images in the suitable pair of images;
(d) locating a first boundary of the bucket in the displacement image;
(e) locating a second boundary of the bucket in the displacement image;
(f) creating a model bucket tooth line using the coordinates of the first boundary and the second boundary;
(g) comparing the bucket tooth line from the displacement image with the model bucket tooth line; and
(h) identifying a damaged or missing tooth from the comparison of the bucket tooth line from the displacement image and the model bucket tooth line.

The fourth method aspect may be further comprised of providing a sensible output which indicates a damaged or missing tooth.

The processing of images, including the initial processing, the final processing, and comparing the bucket tooth line from the displacement image with the model bucket tooth line, may be performed using any suitable computer vision, image motion, optical flow, image matching or pattern matching method. For example, the processing of pairs of images may be performed using techniques used in stereo matching. The processing of images is preferably performed using a computer which is directed by computer codes to perform aspects of the method.

In preferred embodiments, the processing of images is performed using pattern matching or block matching methods. Such pattern matching or block matching methods may include various matching criteria and/or search strategies. As non-limiting examples, matching criteria may include maximum cross-correlation, minimum mean square error, minimum mean absolute difference and maximum matching pixel count methods. As non-limiting examples, search strategies may include three step search or cross search methods.

Pattern matching or block matching methods which are suitable for use in some or all aspects of the method of the invention may be embodied in commercially available software or may be performed using custom applications.

As an example of commercially available software, Matrox Imaging, a division of Matrox Electronic Systems Ltd. of Dorval, Quebec has developed the Matrox Imaging Library (MIL) as a development kit for pattern matching and block matching software solutions. One or more modules within the MIL may be used for aspects of the method of the invention.

The generation of displacement images from captured images may similarly be performed using commercially available software, or may be performed using custom application for the generation of the displacement images.

In the preferred embodiments of the invention, the processing of the images, including pattern matching/block matching and the generation of displacement images from pairs of images, is performed using a combination of commercially available software and custom applications which both apply methods known in the art of image processing.

The initial processing of pairs of images may be performed in a manner which minimizes the initial processing time. The initial processing time may be minimized using techniques known in the art, by specifying processing parameters and by defining search constraints. However, the initial processing of images is preferably performed using a relatively large area of the images, since one of the goals of the initial processing is to determine the magnitude of the relative movement of pixels in the pair of images in order to assess the suitability of the pair of images for final processing.

The final processing of pairs of images is preferably performed in a manner which balances the required accuracy of the method with the required speed of the method. As a result of the initial processing, the final processing in many applications may be performed using a relatively small area of the images, since the expected position of the pixels in the two images will to some extent be known.

BRIEF DESCRIPTION OF DRAWINGS

Embodiments of the invention will now be described with reference to the accompanying drawings, in which.

DETAILED DESCRIPTION

Determining the presence or absence of a tooth on a mining shovel by inspection of a single image taken by a camera is difficult. If two time-separated images of the bucket of the mining shovel are captured while the mining shovel is being operated, the apparent movement of background pixels and bucket pixels (i.e., foreground) can be different. This difference in movement can be used to determine which pixels in the captured images are part of the bucket (foreground) and which pixels are part of the background.

The present invention is a remote 'machine vision' technology, which in the preferred embodiments utilizes video camera output and specialized computer algorithms to monitor bucket teeth on a mining shovel.

The bucket tooth line of the bucket is analyzed on each upswing of the mining shovel and compared against a base-case scenario of a fully intact tooth line. When a tooth is partially or completely broken or missing, the system automatically alerts the shovel operator by a sensible output in the form of a visual alarm on a touch screen monitor.

With the system of the invention, shovel operators are alerted to partial or complete tooth breakage as soon as the shovel comes into the viewing range of the camera.

The invention offers the following benefits to a mine site:
(a) prevents broken bucket teeth from damaging the crusher, conveyer belts, screens, pumps and other expensive equipment;
(b) minimizes downtime by detecting broken teeth at the time of the breakage incident; and
(c) improves overall efficiency in the mining operation through constant monitoring of the bucket tooth line status in terms of teeth wear.

In the preferred embodiment, the system (20) of the invention comprises a number of components that make up the hardware and provide the software which includes the algorithms for system operation.

Figure 1:
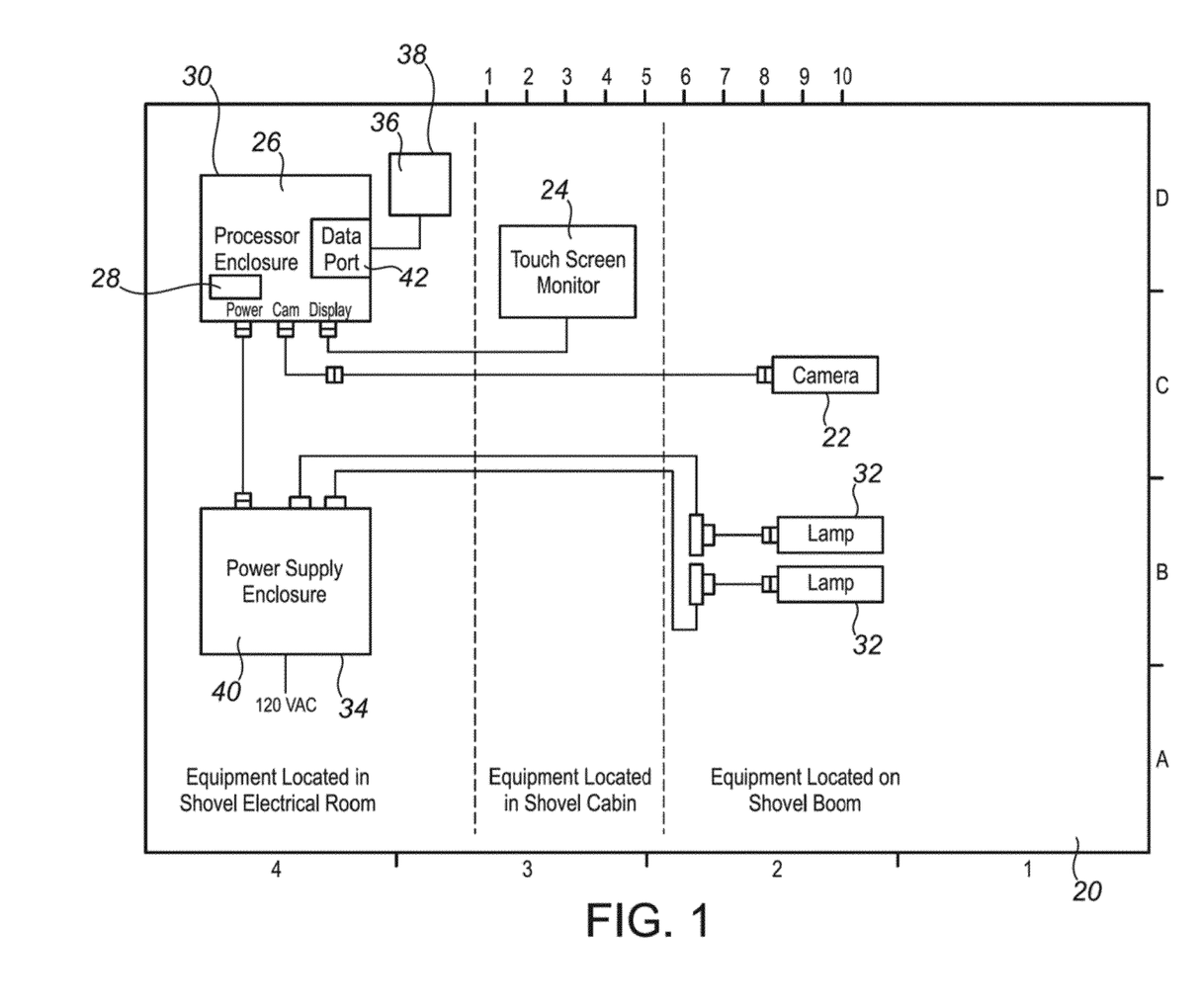
FIG. 1 is a block diagram of a system for detecting a damaged or missing tooth on a mining shovel, according to a preferred embodiment of the invention.

The features of the preferred embodiment of the system (20) can be summarized as follows:
(a) industrial-grade components, no moving parts, rugged construction;

(b) a lightweight, vibration resistant video camera (22) as an image capturing device, designed for rugged outdoor operation, combined with a sun shroud for protection;

(c) a compact (10.4") rugged LCD monitor (24) with resistive touch screen display. When a missing tooth is detected, the operator can both check the sensible output (i.e., visual alarm) and inspect a real time image of the bucket tooth line;

(d) fully molded connectors designed for rugged application, combined with cable wiring that is resistant to severe weather conditions and rugged shovel operations;

(e) PC 104 computing hardware (26) with a Windows XP embedded operating system;

(f) software providing image matching/pattern matching algorithms, which software resides on a computer readable medium such as a compact flash card (28) which inserts into the processor (26);

(g) NEMA IV enclosures to protect the components of the system (20).

A block diagram of the components of the system (20), according to a preferred embodiment of the invention, is provided as FIG. 1.

Referring to FIG. 1, the following provides a description of the components of the system (20).

The camera (22) is provided by Kongsberg from Scotland. The required field of view for each shovel application is determined and the required field of view is provided for in the camera (22).

The central processing unit (CPU) (26) processor enclosure (30) is designed in accordance with NEMA IV specifications and incorporates Mil-Spec connectors. This processor enclosure (30), which is sealed and weatherproof, should be placed in the shovel instrument room (not shown).

The high intensity discharge (HID) lamps (32) are model number Hella AS200FF Xenon HID lamps, manufactured by Hella KGaA Hueck & Co.

The power systems are designed in accordance with the user's specifications. In the preferred embodiments, 120 Volt AC is provided to the system (20). Power is converted to 12 or 24 Volt DC for the lamps (32), the monitor (24) and the CPU (26). The lamp (32) power is supplied directly from the power supply enclosure (34). Power for the camera (22) and the monitor (24) is supplied through the processor enclosure (30) via cables that supply electrical power and transmit image capture (camera) and touch screen controls (touch screen monitor).

An optional data storage device (36) (preferably a +200 Gigabyte portable hard drive) may be included. This extended data logging capability facilitates troubleshooting and resolution of any site-specific issues that may arise in the course of installing and using the system. Where a data storage device (36) is provided, a separate data storage device enclosure (38) may be provided for this component.

The user interface is preferably an industrial touch screen monitor (24).

The processor (26), power supply elements and optional data storage device (36) are preferably placed in separate NEMA IV enclosures that may be placed in an electrical room on the mining shovel (not shown).

The processor enclosure (30) contains the processing hardware (26) and the power supply (40) for the camera (22) and touch screen monitor (24). From this enclosure, the camera (22) and monitor (24) are powered. There are three Mil-Spec connectors on the bottom of the processor enclosure (30) for DC Power in, a cable for the touch screen monitor (24), and the cables for the camera (22). A data port (42) is also located on the processor enclosure (30), which data port (42) includes a USB connector and a network connector. The USB connector can be used by the data storage device (36) or by a USB memory stick, for downloading data. The network connection can be used by a laptop computer for diagnostic purposes.

The operating system of the processor (26) utilizes a Windows-XP embedded system which has been designed to reliably handle power interruptions without corrupting or hanging up the processor (26). The processor (26) boots when power is present and flicking power off/on at any time during shovel operations is acceptable.

The processing software is stored on a computer readable medium such as a compact flash card (28) which inserts into the processing hardware (26). Details of the methods and algorithms which are included in the processing software are provided below in connection with the description of a preferred embodiment of the method of the invention.

The power supply enclosure (34) contains the elements that connect to the 120 Volt AC input provided on the mining shovel. 120 Volt AC is run into the power supply enclosure (34) and connected to the terminals. The connection must be a sealed connection to ensure conformance to NEMA IV specifications. In the preferred embodiment the 120 Volt AC power is converted and provided to the power inlet of the processor enclosure (30) as 24V DC.

Power for the lamps (32) is provided from the power supply enclosure (34) directly to the lamps (32) as 24 Volt DC. A feature provided in the power supply enclosure (34) is a time-delay relay which turns on lamps sequentially in order to avoid excessive power draw on start-up (the lamps require 10 Amps each to start, but normal current usage is 1.6 Amps for each lamp).

The data storage device enclosure (38) contains the data storage device (36) and is preferably installed in the electrical room of the mining shovel.

The image capturing device (22) is preferably a high resolution monochrome video camera Model 0414-6002-002, manufactured by Kongsberg.

The lamps (32) are 35 watts and require 24 Volt DC power. Preferably two (2) lamps (32) are used to illuminate the bucket. The lamps (32) are resistant to mechanical vibration and shock, but care must be exercised when the lamps (32) are in use or being transported.

The camera (22) and the lamps (32) are preferably placed separately on the shovel boom (not shown).

The camera mounting bracket preferably can be loosened to allow altering the camera pan position. Preferably both the camera (22) and lamps (32) are capable of both panning and tilting movement.

The lamp power cable or cables are preferably Tech Cable #14, armoured PVC cable. Conduit Tee LB junction units are preferably provided for each lamp (32) to allow connection of the lamp power cable to the two lamps (32). This conduit Tee is weatherproof and is designed for rugged applications and is preferably placed on the lamp mount.

A compact (10.4"), rugged, flat panel LCD monitor (24), with resistive touch screen, is preferably provided as the operator interface. This monitor (24) is preferably placed in the cab of the mining shovel within reach of the shovel operator. The monitor (24) is connected to the processor enclosure (30) via a single cable. This cable provides the power, VGA signal, and touch screen communications. The screen of the monitor (24) provides an image of the bucket and a visible alarm in the event of detection of damaged, broken or missing teeth. The interface is designed to show initially a yellow dot on a specific tooth location where there might be damage or significant wear. A red dot will appear if a full tooth missing.

The preferred monitor (24) is a model LMV10 provided by Datalux. Details of the specifications of the preferred monitor (24) can be found at www.datalux.com.

Mil-Spec cable connectors using adhesive heat shrink are preferably provided for all cables in order to provide weather protection.

The camera cables are preferably provided by Intec Video Systems. The main function of the cable jackets is to protect the primary insulation from environmental damage. The Intec Video Systems cables have polyurethane cable jackets that offer high performance and durability by providing long-lasting protection in applications requiring low-temperature flexibility, good weathering properties and resistance to wet environments.

Polyurethane consistently outperforms conventional rubber compounds; its abrasion resistance makes polyurethane superior to copolyester and thermoplastic polyolefins, and it also offers superior protection from physical damage. Polyurethane cable jackets are also excellent for applications over a wide range of temperatures. Over extended use, polyurethane continues to protect the inner components of assemblies at temperatures up to 50° C., as well as offering low temperature flexibility to −40° C.

A 3-conductor power connector cable, designed for outdoor and low temperature (−70° C.) applications, is preferably used to connect the power supply enclosure (34) to the processor enclosure (30).

The main lamp power cables are preferably armour coated #14 tech PVC cables. FIG. 1 depicts two cables connecting the lamps (32) to the power supply enclosure (34). In practice, two cables with two conductors each, or one cable with four conductors may be used to provide the lamp power cables.

Connection cables are required from both LB Junction Conduit Tees to the lamps (32), which cables are preferably the same type of cable as the power connector cable described previously.

A standard VGA cable is required for the touch screen monitor (24). This cable provides power, a VGA signal, and touch screen communications. This cable is connected to the processor enclosure (30).

A standard USB cable may be used to connect the data storage device (36) to the data port (42) on the processor enclosure (30).

The following provides a description of the installation of the system (20) on a mining shovel.

The camera mount is installed on the shovel boom and preferably has an adjustment bracket that allows the camera (22) to move both horizontally and vertically for achieving proper image capture. The lamps (32) are also mounted on the shovel boom.

The cable connections along the shovel boom should be connected to ensure secure fastening during rugged operations.

The touch screen monitor (24) is preferably placed in the main cab of the mining shovel, within reach of the operator and is connected using the touch screen monitor cable. The length of the touch screen monitor cable is preferably limited to 25 feet in order to maintain vision quality on the screen.

The system enclosures (30,34,38) are designed for placement in the electrical room of the mining shovel. They are preferably fastened to the wall using mounting kits. The enclosures (30,34,38) are preferably sized as follows:
  (a) the power supply enclosure (34) preferably has nominal dimensions of about 20"×16"×6";
  (b) the processor enclosure (30) preferably has nominal dimensions of about 12"×12"×6";
  (c) the data storage device enclosure (38) (where provided) preferably has nominal dimensions of about 12"×10"×4".

A 120 Volt AC power line and the lamp cable(s) are connected to the power supply enclosure (34). In the preferred embodiments the lamp cable(s) must be capable of handling up to 12 amps of current.

The following provides a description of the procedure for starting up and operating the system (20).

Once all of the power supply enclosure (34), the processor enclosure (30), the data storage device enclosure (38), the monitor (24), the cable connections, the camera (22) and the lamps (32) are installed and connected, the system power supply (40) may be turned on, which causes the processor (26) to "boot up". Once the processor (26) has booted up, the screen of the monitor (24) will display a full image from the camera (22).

The orientation of the camera (22) is important for the optimal functioning of the system (20). The better the orientation of the camera (22), the better the image capture in all conditions. The following steps are recommended for setting up the camera (22) and for subsequent image capture:
  (a) the bucket should be positioned on the ground in order to begin the orientation of the camera (22);
  (b) the camera (22) "pan" should be adjusted to center the bucket (48) in the monitor screen horizontally;
  (c) The camera (22) "tilt" should then be adjusted so that the top half of the bucket (48) is visible on the monitor screen;
  (d) the camera (22) and the lamps (32) may be adjusted as described previously;
  (e) the "rotation" of the camera (22) should be adjusted so that the camera (22) is rotated just slightly off the horizontal in the clockwise direction; and
  (f) all bolts should be checked to ensure that they are tightened. If bolts are tightened, the orientation of the camera (22) should be re-checked to ensure that the camera orientation has remained the same after tightening (the rotation of the camera (22) is particularly important). If necessary, the camera (22) should be loosened and re-adjusted if tightening the bolts changes the position of the camera (22).

Figure 4:
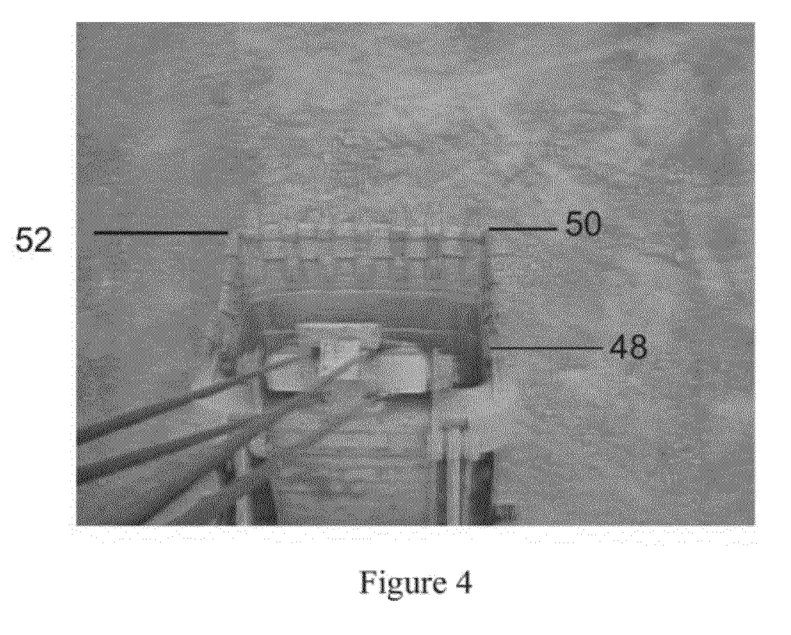
FIG. 4 is a first captured image in a sequence of captured images.
Figure 5:
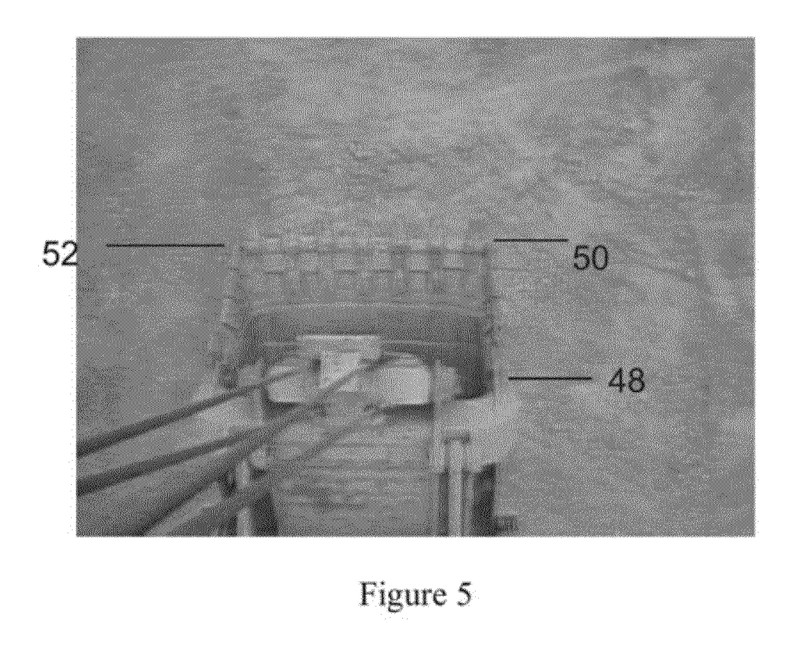
FIG. 5 is a second captured image in a sequence of captured images.

With proper camera (22) orientation, the image that should appear is similar to the images in FIG. 4 and FIG. 5. The image includes the bucket (48) and the teeth (50) which are located on the bucket (48).

During operation of the system (20) the image stays full until a missing tooth incident occurs. When a missing tooth incident is detected, the screen of the monitor (24) changes automatically to the image shown in FIG. 11, and a yellow or red dot will appear in one or more of the tooth indicators.

Figure 12:
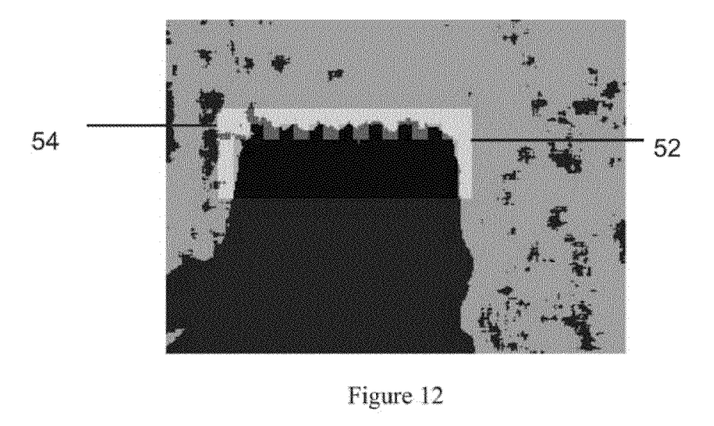
FIG. 12 is a schematic drawing depicting the displacement image of FIG. 6 with the model bucket tooth line superimposed thereon.

If the operator then touches the "Acknowledge" button, the screen changes automatically to the image shown in FIG. 12. In this view, the operator may touch the left tab (<<) or the right tab (>>) buttons in order to view previous or subsequent images of the bucket (48), and thus determine when the tooth or teeth (50) became broken or missing (eg. during loading or the bucket (48) or unloading of the bucket (48)).

Figure 2:
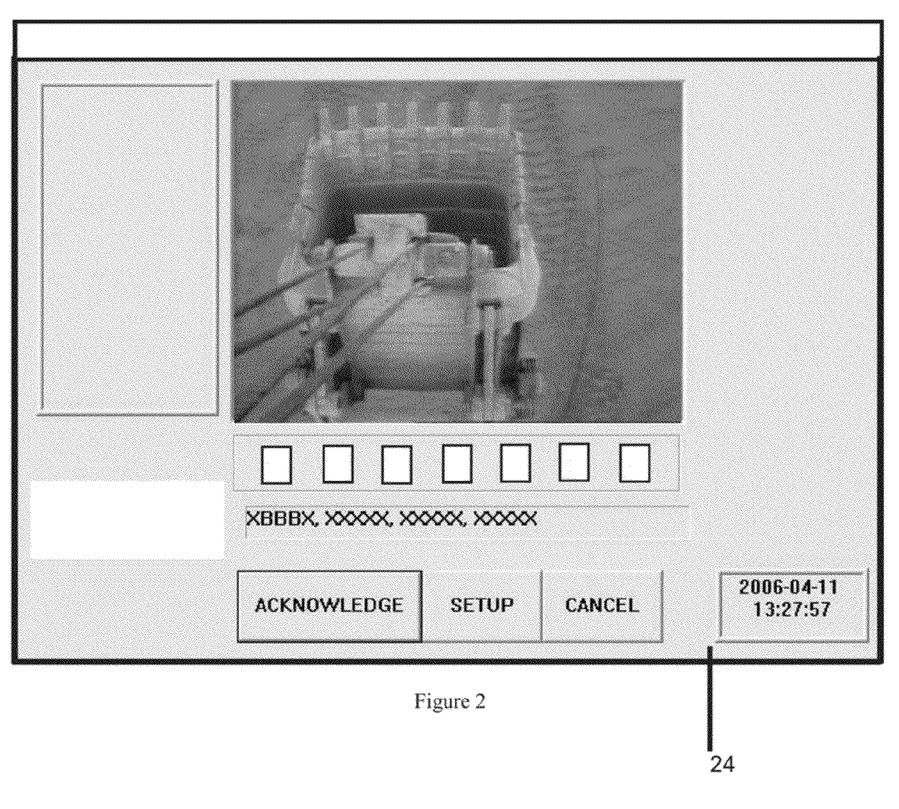
FIG. 2 is a view of a touch screen monitor according to a preferred embodiment of the invention upon the detection of a damaged or missing bucket tooth.
Figure 3:
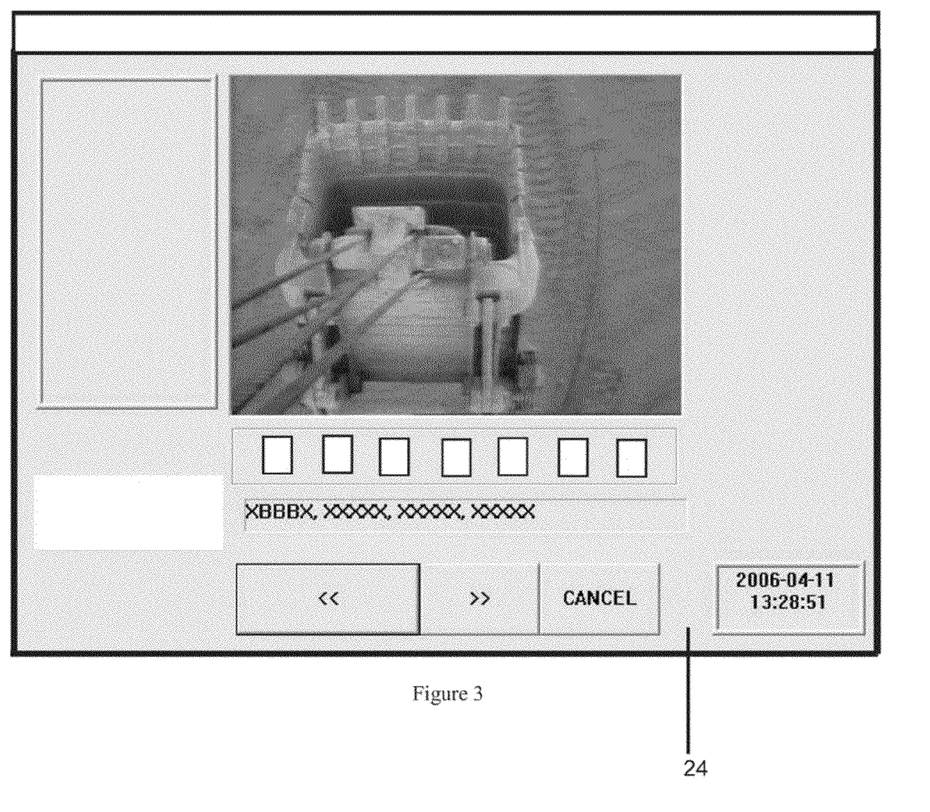
FIG. 3 is a view of a touch screen monitor according to a preferred embodiment of the invention following the touching of the "Acknowledge" button in the view of FIG. 2.
Figure 6:
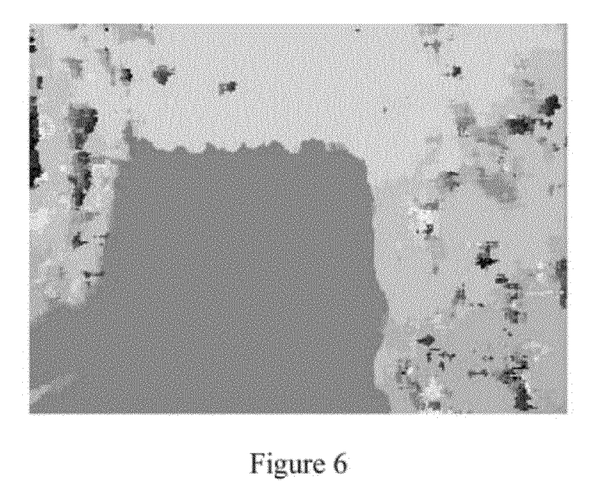
FIG. 6 is a displacement image generated from the captured images from FIG. 4 and FIG. 5.
Figure 7:
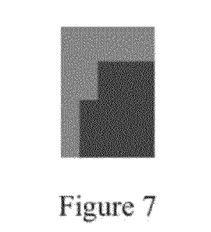
FIG. 7 is a model of an upper left corner of a bucket, representing a first boundary of the bucket.
Figure 8:
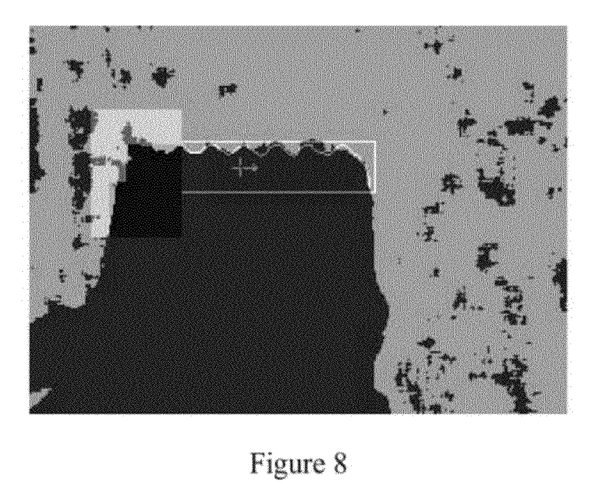
FIG. 8 is a schematic drawing depicting the displacement image of FIG. 6 with the model of FIG. 7 superimposed thereon.
Figure 9:
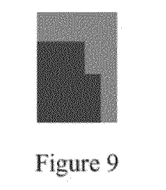
FIG. 9 is a model of an upper right corner of a bucket, representing a second boundary of the bucket.
Figure 10:
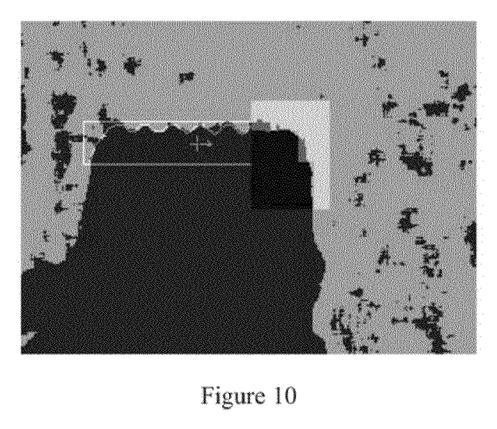
FIG. 10 is a schematic drawing depicting the displacement image of FIG. 6 with the model of FIG. 9 superimposed thereon.
Figure 11:
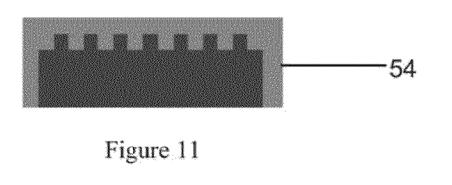
FIG. 11 is a model bucket tooth line created using the coordinates of the first boundary of the bucket and the second boundary of the bucket.

The following provides an example of a preferred embodiment of the method of the invention, described with reference to FIGS. 4-12:
  1. capture a continuous sequence of images using the video camera (22). For best results, images should be captured at a frame rate of at least 60 frames per second and a set of a minimum of 5 images should be captured. The speed of image capture which provides good results is a function of the camera resolution and the apparent velocity of the background and foreground. For best results the frame rate and resolution of the camera (22) and the number of images captured should be chosen so that the pixels comprising the background or the pixels comprising the foreground have moved on average a distance of 4 pixels when comparing 2 images out of the set of images. Increasing the number of images in a set of captured images improves the chance of finding a suitable pair of images if the background or foreground are moving slowly relative to each other. Increasing the image capture rate increases the chance of finding a suitable pair of images if the background and foreground are moving rapidly relative to each other. Reducing the camera resolution reduces the processing time required. Increasing the camera resolution increases the sensitivity of the system for detecting damaged or missing teeth (50). Good results have been achieved with an image resolution of 640×240 pixels, a capture rate of 60 images per second, a dataset comprising a sequence of 5 images, and an average movement of 4 pixels;

2. select a suitable pair of images based upon the criteria outlined above. A suitable pair of images is depicted as FIG. 4 and FIG. 5;

3. using a suitable pattern matching algorithm (for example, a "sum of absolute differences" method) determine how far each pixel has moved during the time between when the images of FIG. 4 and FIG. 5 were captured. Convert the distance moved by each pixel to an 8 bit grayscale image having a pixel intensity from 0 to 255 to create a displacement image as shown in FIG. 6. In order to minimize the processing time involved 2 images should be selected so that the maximum difference in movement of the foreground pixels relative to the background pixels is about 7 pixels. In order to maximize the difference or contrast between the foreground and background in the displacement image the pair of images should be selected so that minimum difference in movement of the foreground pixels relative to the background pixels is about 3 pixels;

4. using a pattern matching algorithm (for instance the Matrox™ pattern matching function) find the top left corner of the bucket (48) (i.e., the foreground) in the displacement image of FIG. 6 as a first boundary of the bucket (48). This is done by creating a model representative of the general shape of the top left corner of the bucket (48) in the displacement image, as shown in FIG. 7. The pattern matching algorithm is used to find the best location of the model of FIG. 7 in the displacement image of FIG. 6, which best location is depicted schematically in FIG. 8;

5. using a pattern matching algorithm (for instance the Matrox™ pattern matching function) find the top right corner of the bucket (48) (i.e., the foreground) in the displacement image of FIG. 6 as a second boundary of the bucket (48). This is done by creating a model representative of the general shape of the top right corner of the bucket (48) in the displacement image, as shown in FIG. 9. The pattern matching algorithm is used to find the best location of the model of FIG. 9 in the displacement image of FIG. 6, which best location is depicted schematically in FIG. 10;

6. using the coordinates of the first boundary of the bucket (48) and the second boundary of the bucket (48) as located above, calculate the approximate size of the actual bucket tooth line (52) and create a number of models which are representative of the general shape of the actual bucket tooth line (52). The best representative shape of the actual bucket tooth line (52) depends on the bucket (48) being monitored. For example, the model shown in FIG. 11 is representative of the actual bucket tooth line (52) for the example depicted in FIGS. 4-12. Model sizes which bracket the estimated size of the bucket (48) should be created. The Matrox™ pattern matching function (or something similar) is used to find the location of each proposed model in the displacement image as demonstrated schematically in FIG. 12. The model which fits the best as indicated by the pattern matching method is selected as the model bucket tooth line (54);

7. calculate the number of "tooth" pixels from the model bucket tooth line (54) of FIG. 11 which overlay "foreground" (i.e., the actual bucket tooth line (52)) pixels from the displacement image of FIG. 6. This calculation is performed for each tooth in the bucket tooth line model (54);

8. a suitable criterion is established for the minimum number of common pixels which must occur with respect to a tooth (50) to indicate the tooth (50) being present, missing or damaged. For example, no indication may represent a first threshold number of common pixels, a "yellow" indication may indicate a second threshold number of common pixels, and a "red" indication may indicate a third threshold number of common pixels, where the first threshold number is greater than the second threshold number and the second threshold number is greater than the third threshold number; and 9. depending upon the number of common pixels which are observed for each tooth (50), a sensible output (such as the graphical display depicted in FIG. 2 and FIG. 3), may or may not be provided.

The invention claimed is:

1. A method for detecting a damaged or missing machine part, the method comprising:
    (a) capturing images of a machine and a background, wherein the background moves relative to the machine over time
    (b) selecting time-separated images which reflect movement of the background relative to the machine;
    (c) generating a displacement image from the selected time-separated images, wherein the displacement image provides an indication of movement of each pixel represented in the displacement image between the selected time-separated images;
    (d) comparing the machine from the displacement image with a model machine; and
    (e) identifying a damaged or missing machine part from the comparison of the machine from the displacement image and the model machine.

2. The method as claimed in claim 1, further comprising providing a sensible output which indicates the damaged or missing machine part.

3. A system for detecting whether a machine part of a machine is damaged or missing, the system comprising:
    (a) an image capturing device for capturing time-separated images of the machine and a background, wherein the background moves relative to the machine over time, and wherein the captured time-separated images are comprised of pixels; and
    (b) a processor configured to generate a displacement image from time-separated images selected from the captured time-separated images, wherein the displacement image provides an indication of movement of the pixels between the selected time-separated images, and configured to identify from the displacement image whether the machine part is damaged or missing.

4. The system as claimed in claim 3, further comprising a sensible output for providing an indication if the machine part is damaged or missing.

5. The system as claimed in claim 3 wherein the processor is further configured to select the time-separated images such that the selected time-separated images reflect movement of the background relative to the machine.

6. The system as claimed in claim 5 wherein the processor is configured to select the time-separated images by initial processing one or more pairs of the captured time-separated images.

7. The system as claimed in claim 6 wherein the initial processing is comprised of determining whether the machine can be adequately identified in the pairs of captured time-separated images.

8. The system as claimed in claim 7 wherein the machine can be adequately identified in the pairs of captured time-separated images if the machine is within a defined position zone of the captured time-separated images and if the machine is within a defined size range in the captured time-separated images.

9. The system as claimed in claim 6 wherein the initial processing is comprised of determining whether the background is moving relative to the machine in the pairs of captured time-separated images.

10. The system as claimed in claim 6 wherein the initial processing is comprised of determining whether a magnitude of movement of the background relative to the machine in the pairs of captured time-separated images is within a desired range.

11. The system as claimed in claim 3 wherein the processor is configured to identify from the displacement image whether the machine part is damaged or missing by comparing the machine from the displacement image with a model machine to provide a comparison, and identifying from the comparison whether the machine part is damaged or missing.

12. A method for detecting whether a machine part of a machine damaged or missing, the method comprising:
   (a) capturing time-separated images of the machine and a background, wherein the background moves relative to the machine over time, and wherein the captured time-separated images are comprised of pixels;
   (b) selecting time-separated images which reflect movement of the background relative to the machine;
   (c) generating a displacement image from the selected time-separated images, wherein the displacement image provides an indication of movement of the pixels between the selected time-separated images;
   (d) identifying from the displacement image whether the machine part is damaged or missing.

13. The method as claimed in claim 12, further comprising providing a sensible output which indicates the damaged or missing machine part.

14. The method as claimed in claim 12 wherein selecting the time-separated images is comprised of initial processing one or more pairs of the captured time-separated images.

15. The method as claimed in claim 14 wherein the initial processing is comprised of determining whether the machine can be adequately identified in the pairs of captured time-separated images.

16. The method as claimed in claim 15 wherein the machine can be adequately identified in the pairs of captured time-separated images if the machine is within a defined position zone of the captured time-separated images and if the machine is within a defined size range in the captured time-separated images.

17. The method as claimed in claim 14 wherein the initial processing is comprised of determining whether the background is moving relative to the machine in the pairs of captured time-separated images.

18. The method as claimed in claim 14 wherein the initial processing is comprised of determining whether a magnitude of movement of the background relative to the machine in the pairs of captured time-separated images is within a desired range.

19. The method as claimed in claim 12 wherein the machine is a bucket and wherein the machine part is a tooth on the bucket.

20. The method as claimed in claim 12 wherein identifying whether the machine part is damaged or missing is comprised of comparing the machine from the displacement image with a model machine to provide a comparison, and identifying, from the comparison whether the machine pan is damaged or missing.

21. A method for detecting whether a machine part of a machine is damaged or missing, the method comprising:
   (a) capturing time-separated images of the machine and a background, wherein the background moves relative to the machine over time, and wherein the captured time-separated images are comprised of pixels;
   (b) initial processing one or more pairs of the captured time-separated images to select time-separated images from the captured time-separated images;
   (c) generating a displacement image from the selected tune-separated images, wherein the displacement image provides an indication of movement of the pixels between the selected time-separated images;
   (d) locating a first boundary of the machine in the displacement image;
   (e) locating a second boundary of the machine in the displacement image;
   (f) creating a model machine using the first boundary and the second boundary;
   (g) comparing the machine from the displacement image with the model machine to provide a comparison; and
   (h) identifying from the comparison whether the machine part is damaged or missing.

22. The method as claimed in claim 21, further comprising providing a sensible output which indicates the damaged or missing machine part.

23. The method as claimed in claim 22 wherein the machine is a bucket and wherein the machine part is a tooth on the bucket.

* * * * *

UNITED STATES PATENT AND TRADEMARK OFFICE
CERTIFICATE OF CORRECTION

PATENT NO.       : 8,411,930 B2
APPLICATION NO.  : 12/300257
DATED            : April 2, 2013
INVENTOR(S)      : Rodney K. Ridley et al.

It is certified that error appears in the above-identified patent and that said Letters Patent is hereby corrected as shown below:

In the Claims

Column 13
Line 4 (claim 4, line 2), change "fbr" to --for--.

Column 14
Line 27 (claim 20, line 5), change "pan" to --part--.
Line 39 (claim 21, line 11), change "tune-separated" to --time-separated--.

Signed and Sealed this
Second Day of July, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,411,930 B2  Page 1 of 1
APPLICATION NO. : 12/300257
DATED : April 2, 2013
INVENTOR(S) : Rodney K. Ridley et al.

It is certified that error appears in the above-identified patent and that said Letters Patent is hereby corrected as shown below:

In the title page,
Change the Assignee from "Alberta Research Council Inc." to -- Alberta Innovates - Technology Futures --

Signed and Sealed this
Thirtieth Day of July, 2013

Teresa Stanek Rea
*Acting Director of the United States Patent and Trademark Office*